United States Patent [19]

Kratt et al.

[11] Patent Number: 4,669,301

[45] Date of Patent: Jun. 2, 1987

[54] METHOD FOR MEASURING THE FLOW RATE OF A MEDIUM FLOWING THROUGH A PIPE AND APPARATUS THEREFOR

[75] Inventors: Alfred Kratt, Trossingen; Cornelius Peter, Stuttgart, both of Fed. Rep. of Germany

[73] Assignee: Robert Bosch GmbH, Stuttgart, Fed. Rep. of Germany

[21] Appl. No.: 839,897

[22] Filed: Mar. 14, 1986

[30] Foreign Application Priority Data

Mar. 14, 1985 [DE] Fed. Rep. of Germany ....... 3509118

[51] Int. Cl.[4] ........................................... G01M 15/00
[52] U.S. Cl. ..................................... 73/118.2; 73/204
[58] Field of Search ................ 73/118.2, 204; 123/494

[56] References Cited

U.S. PATENT DOCUMENTS 4,449,397 5/1984 Lauterbach ......................... 73/118.2
4,463,601 8/1984 Rask ................................... 73/118.2

*Primary Examiner*—Jerry W. Myracle
*Attorney, Agent, or Firm*—Walter Ottesen

[57] ABSTRACT

A method and apparatus are disclosed for measuring the flow rate of a medium flowing through a pipe. The invention is particularly for measuring the rate of air flow in the intake pipe of an internal combustion engine by means of a throughput sensor which is insensitive to the direction of flow. The throughput sensor can be a constant-temperature anemometer. The analog output signals of the sensor are converted into a sequence of discrete numerical values with an adjustable sampling rate, wherein the periodic output signal characteristic of the flow meter is weighted for determining the occurrence of changes in the direction of flow, and wherein the duration of time in which the direction of flow is changed is considered in the determination of the flow rate via corresponding correction factors. In the method and apparatus of the invention, the points in time at which changes in the direction of flow occur are determined according to the following steps: (a) comparing the differential values of successive numerical values of the number sequence with a first threshold value particularly dependent on the sampling rate; (b) determining the characteristic time points at which the first threshold value is exceeded or drops below; and, (c) recognizing the change of flow direction with the occurrence of more than two characteristic instants per period of the output signal.

27 Claims, 17 Drawing Figures

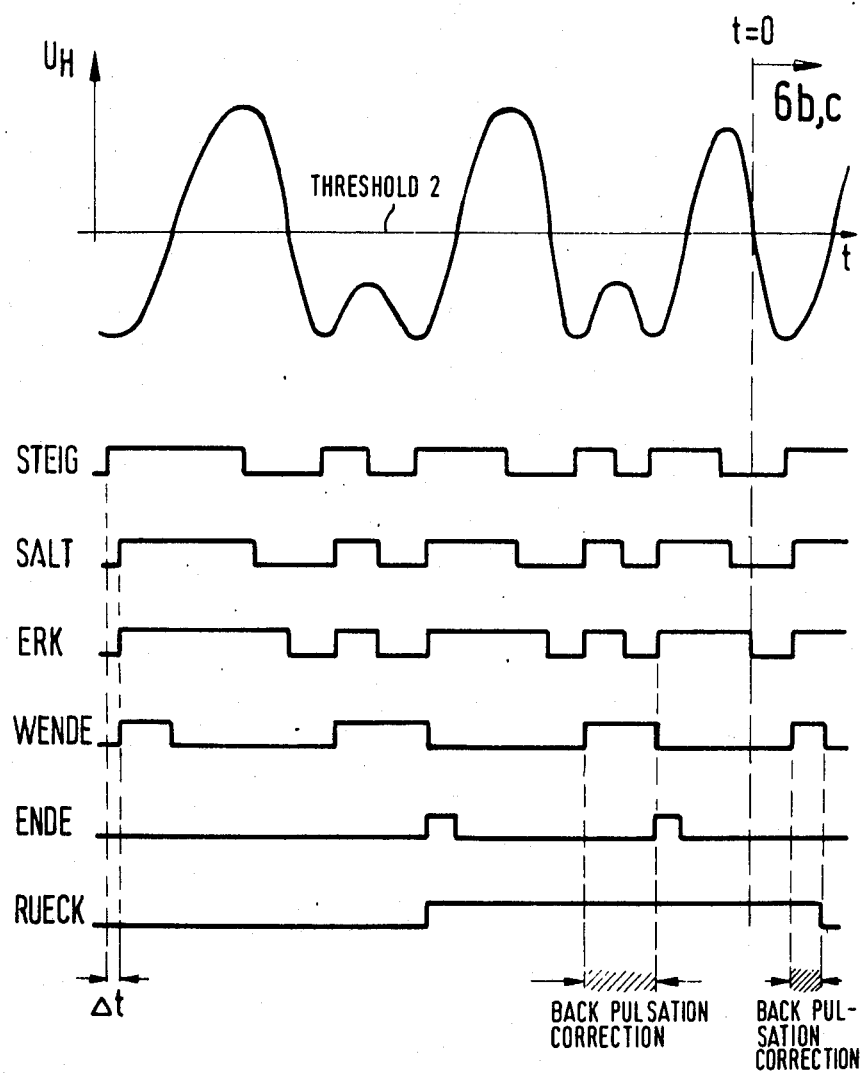

FIG. 8a

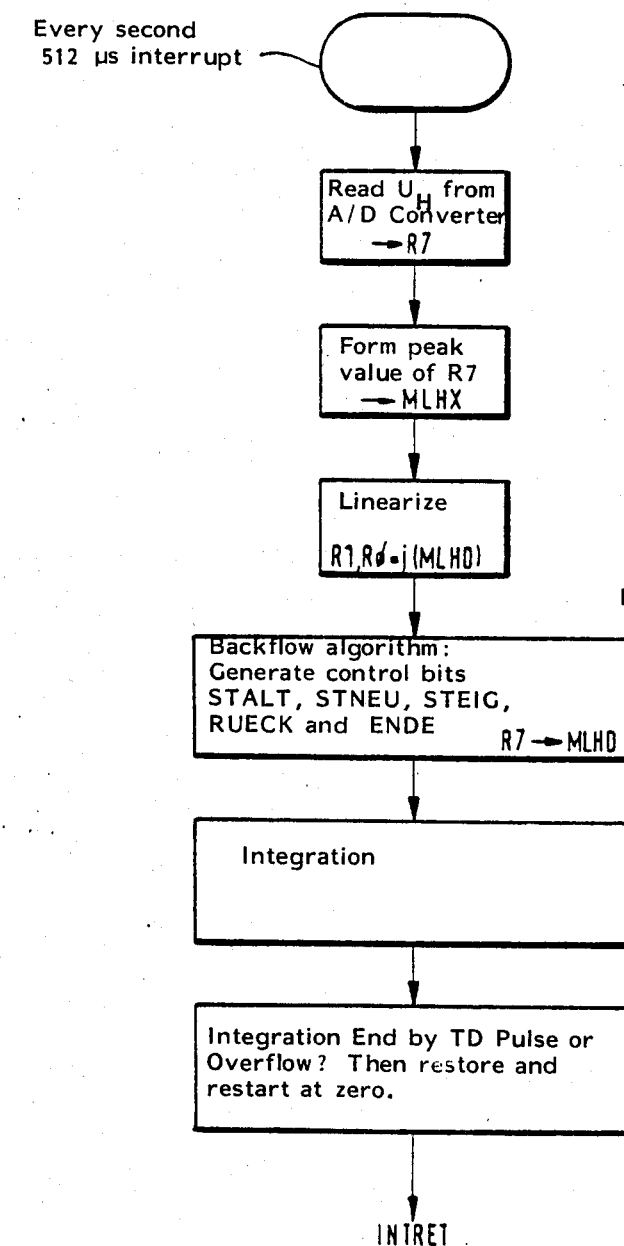

| | | |
|---|---|---|
| R7 | − | actual sampling rate of flow-rate sensor voltage |
| MLHO | − | Last (1 ms old) sampling value of the flow-rate sensor voltage |
| MLHX | − | Peak value of flow-rate sensor voltage |
| ST L | − | last (1 ms old) slope (1=positive, 2=negative) |
| STNE | − | actual slope |
| STEIG | − | interference-free slope |
| WENDE | − | 1 between two minima detected minima |
| RUECK | − | 1 for detected backflow |
| ENDE | − | 1 after 2 detected minima |
| DREHBEG | − | 1 if rotational-speed condition satisfied |

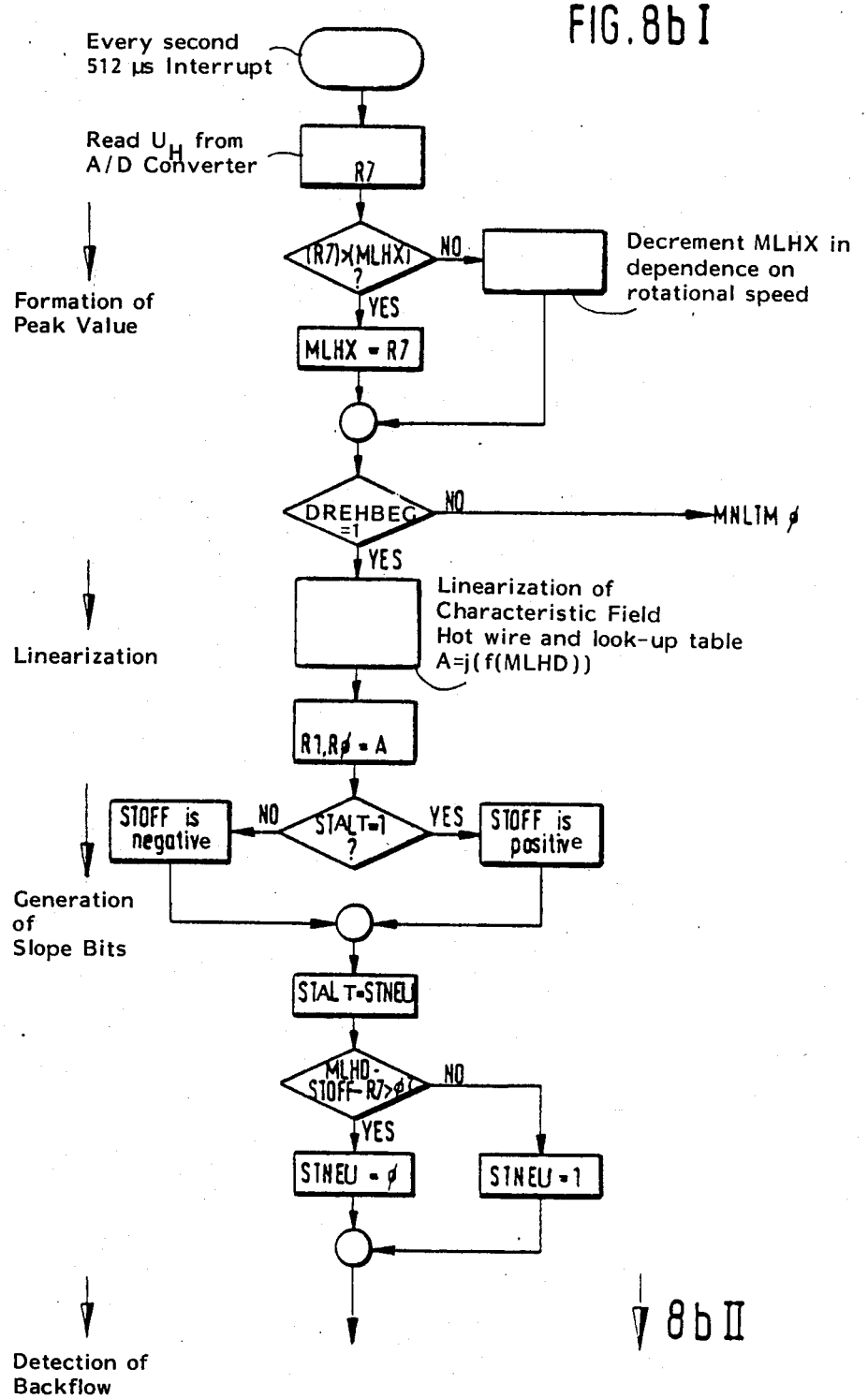

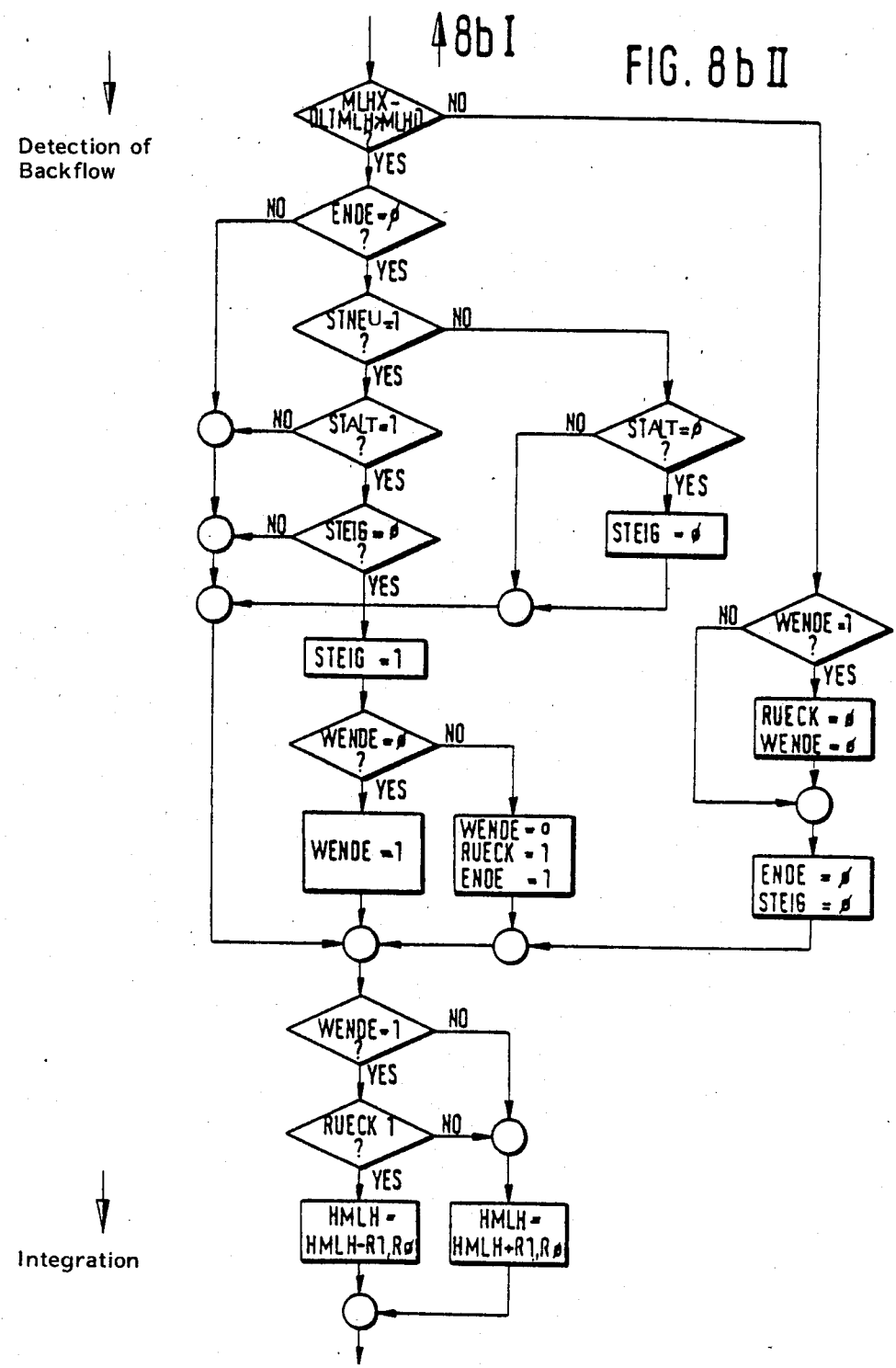

METHOD FOR MEASURING THE FLOW RATE OF A MEDIUM FLOWING THROUGH A PIPE AND APPARATUS THEREFOR

FIELD OF THE INVENTION

The invention relates to a method for measuring the flow rate of a medium flowing through a pipe such as the intake pipe of an internal combustion engine.

BACKGROUND OF THE INVENTION

U.S. Pat. application Ser. No. 578,866, filed on Feb. 10, 1984, now U.S. Pat. No. 4,571,990 discloses a method for measuring the rate of air flow in the intake pipe of an internal combustion engine. This method uses a flow metering device which is insensitive to the direction of flow. In order to ensure continued accuracy of the measured air quantity drawn in by suction by the internal combustion engine also in the event of a change in the direction of flow, as it may occur with pulsations in the intake pipe, this application discloses various methods for determining the points in time of flow reversal. The determination of these reversal points is based on specific physical relationships between: the flow metering signal, differential pressures, the occurrence of extreme values in the flow metering signal and the gradient of the flow metering signal.

It has been shown, however, that these methods do not yield optimum results for any type of internal combustion engine; moreover, they may even provide incorrect results by way of disturbances superposed on the measured value sensor output signal.

SUMMARY OF THE INVENTION

Therefore, it is an object of the invention to provide a method and apparatus permitting the reversal points of the flow direction to be detected with a high degree of reliability. By contrast to the state of the art, the method and the apparatus of the invention afford the advantage of improving the detection of the flow direction reversal points, thereby ensuring an increased accuracy of the measuring system. In addition, it has proved to be particularly advantageous that the measuring system is to a high degree insensitive to interference pulses which are superposed on the output signal of the throughput measured value sensor.

Another advantage consists in checking only a specific amplitude range of the throughput measured value sensor output signals for the presence of such flow direction reversal points and to vary this range in dependence on, for example, time or rotational speed, whereby the accuracy of the measuring system is further increased.

In addition, this increased accuracy in the detection of flow reversal points permits further processing of the composite signal of the discrete numerical values with an increased resolution.

Further advantages of the invention will become apparent from the subsequent description of the embodiment in conjunction with the drawing and from the claims.

BRIEF DESCRIPTION OF THE DRAWING

The invention will now be described with reference to the drawing wherein:

FIGS. 6a to 6c are various time diagrams showing the course of the parameters of the flowchart of FIG. 5 for exemplary signal shapes of the throughput sensor;

FIG. 8A to 8BII are modifications of the flowchart of FIG. 5 to implement the method of the invention.

DESCRIPTION OF THE PREFERRED EMBODIMENTS OF THE INVENTION

The following relates to a method and apparatus for determining a fuel metering signal for an internal combustion engine. The load sensor is a constant-temperature anemometer which is provided in the intake passage of the internal combustion engine. Apparatus of this type have long been known in the art and are described, for example, in U.S. Pat. No. 4,275,695 which, together with U.S. patent application Ser. No. 578,866 referred to above are incorporated herein by reference. Therefore, only those features of the method or the apparatus which are specific to the invention will be discussed in more detail in the following.

For correct metering of fuel, fuel metering systems require an information on the amount of air drawn in by suction by the engine which should be as accurate as possible. A particularly preferred method of determining the air quantity consists in the use of a hot-wire or hot-film anemometer in constant-temperature operation. As a result of the high response speed which is in the order of one millisecond, the output signal of the air flow sensor follows each pulsation in the air current. Backflowing air masses are also detected as they occur particularly in the full-load range of the internal combustion engine in the form of pulsation in the intake pipe, however, with the false operational sign. In the absence of corrective measures, the pulsations therefore cause an excessive measured value for the amount of air inducted and thus cause a fuel metering error. In the above-mentioned U.S. patant application Ser. No. 578,866, a method for detecting the pulsations and correcting the air throughput value has already been proposed which, however, can only be applied to a very specific characteristic of the output signal of the air flow sensor. In addition, the known method does not detect interference voltages superposed on the output signal of the air flow sensor as they occur in practice, and they are frequently misinterpreted as pulsations.

Figure 1A:
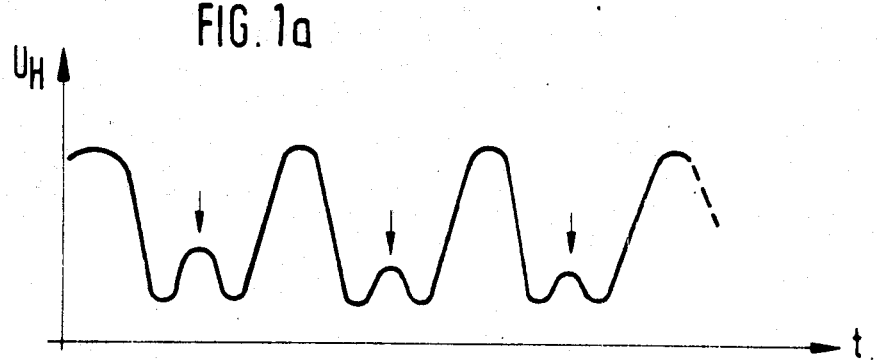
FIGS. 1A to 1C are graphs showing various output signals of the throughput sensor.

FIG. 1 shows various characteristic curves of the output signal of an air flow sensor in the presence of back pulsations. In FIG. 1a, the signal curve shows harmonic waves in addition to the pulsation fundamental waves, with the even harmonic waves being quite distinct. Accordingly, the signal shows a more or less distinct, additional relative maximum (arrow).

Figure 1B:
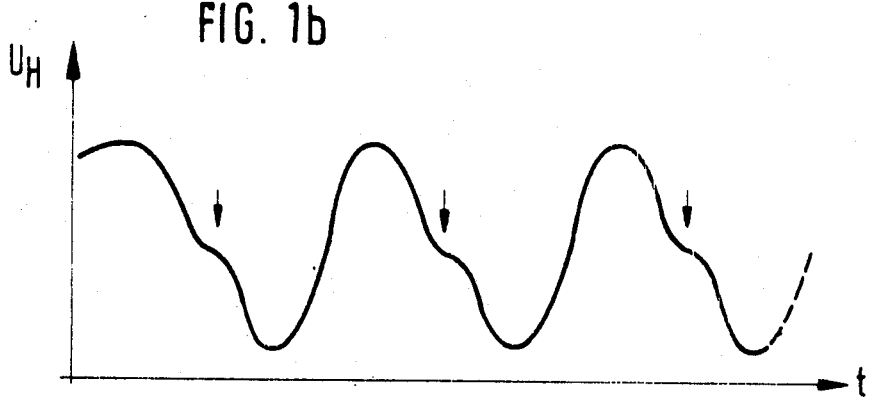
Figure 1C:
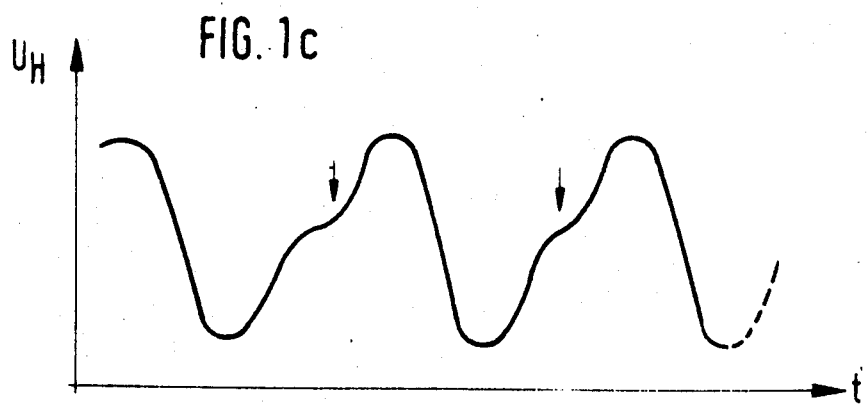

However, signal curves are also known in which the phase shift between fundamental waves and harmonic waves assumes values preventing the occurrence of an additional relative maximum. These signal curves are shown in FIGS. 1b and 1c. In FIGS. 1b and 1c, the back pulsations are merely noticeable in a change in the gradient of the trailing or leading edge of the signal (arrows). The problem here is to reliably detect the occurrence of back pulsations in any one of the cases of FIG. 1. To detect back pulsations on the basis of the specific signal shape, the invention provides a predetermined suitable threshold 1 for the slope, that is, the time derivation of the output signal $U_H$ of the air flow sensor. The points of the output signal which are characteristic of back pulsations or generally characteristic of reversals of the direction of flow are defined over a period of the air quantity signal $U_H$ by either two minima or one minimum as well as by reduced gradients of the signal slopes.

Figure 2A:
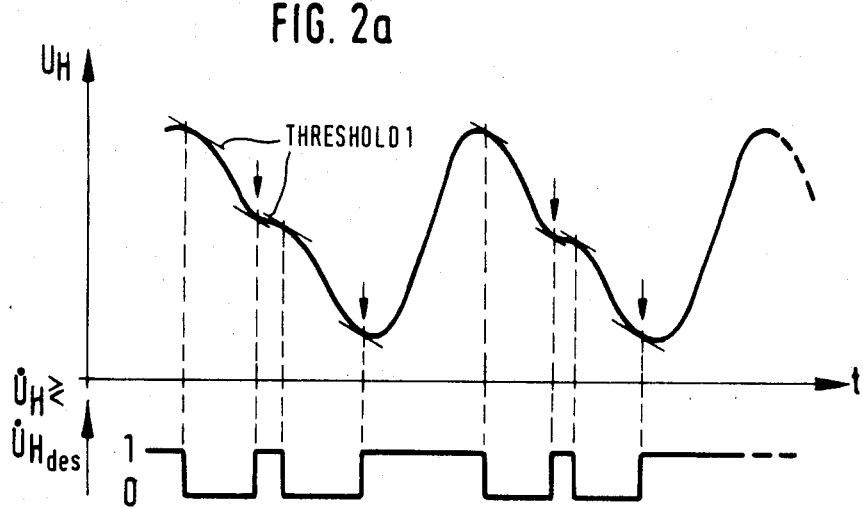
FIGS. 2A and 2B are graphs showing the principle for detecting a change in the flow direction upon which the method of the invention is based.

In the special case of FIG. 2a, the slope threshold value is illustrated by the tangents drawn as a thin line, with the lower part of this figure showing the deviations from this threshold value by the variation of the output voltage with time ($dU_H/dt$). The points characteristic of possible back pulsations are shown by the change of the signal from logic zero to logic one illustrated in the lower part of FIG. 2a. In order to filter out any interference voltages superposed on the air quantity signal $U_H$, a further condition to be fulfilled is that a characteristic point is present only if the difference between the actual-value slope and the threshold 1 has a constant sign over a predeterminable period of time both before and after the signal value drops below the threshold 1. Moreover, it has proved advantageous to introduce a hysteresis in the sampling of the slope. Considering that the back-pulsation signal may also vary in dependence on the engine speed, it has proved necessary in various applications to vary the threshold 1 in dependence on rotational speed or load. Particularly in the back-pulsation signals of FIGS. 1b and 1c, examinations have shown that it is advantageous to provide different threshold values for threshold 1 during one period for determination of the first and the second characteristic point, as is shown schematically in FIG. 2b. In addition, these different threshold values of threshold 1 may also be varied in dependence on the rotational speed.

After the characteristic points of the output signal of the air flow sensor are detected, a back pulsation will be recognized only if more than one characteristic point was detected during one period. In the presence of back pulsations, two characteristic points occur generally during one signal period; the signal amplitudes of these characteristic points have, as a rule, values below the signal steady component of the output signal of the air flow sensor.

Figure 3:
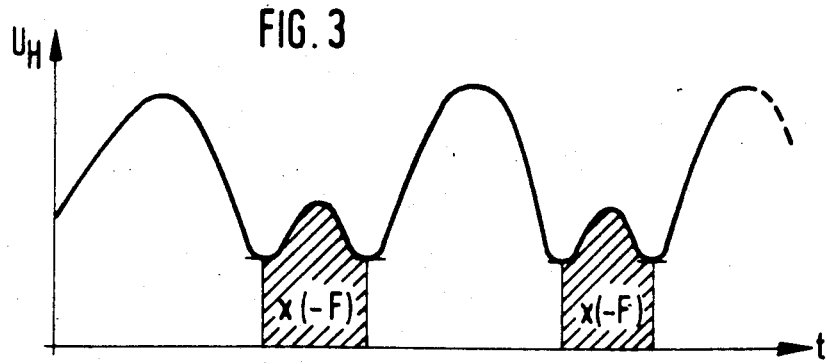
FIGS. 3 and 4A to 4C are illustrations of the procedure for correcting the measured values.

According to FIG. 3, the air flow measurements affected by the back-pulsation error can be corrected in that during those periods of time which are bounded by the characteristic points during one period, the measured air quantity values are weighted negatively with a factor $F > 1$. The factor F assumes values unequal to 1 because the sensitivity of the throughput sensor varies depending on whether a forward or reverse flow is involved. In practice, values in the range of $1.10 \leq |F| \leq 1.30$ have proved to be suitable.

Figure 4A:
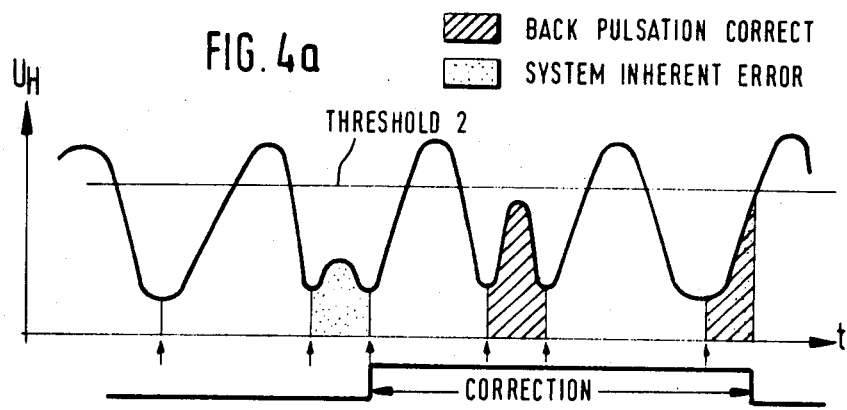

In principle, back pulsations are corrected as follows. The detection of at least two characteristic points during one signal period indicates the presence of a back pulsation. However, no correction takes place as yet during the first back-pulsation period. Memory stores for intermediate storage are not provided. As FIG. 4a shows, it is only during the subsequent periods that the measured air quantity values are corrected during the periods of time bounded by the characteristic points. If the back pulsation ceases, the system erroneously performs a correction during the period of time between the detection of the first characteristic point (which is invariably detected) and the moment when the absence of a second characteristic point is established. In order to minimize this system-inherent error after the end of the back pulsation, a threshold 2 is provided which assumes values of the order of the mean value of the output signal voltage of the air flow sensor. This second threshold limits the signal range of the output signals which is to be checked for the presence of characteristic points. Only for values of the output signal which are below this second threshold is it possible to detect characteristic points. By the introduction of this second threshold the duration of the system-inherent error resulting from the erroneous correction of the output signal values is limited to about one fourth of the period of the output signal.

Figure 4B:
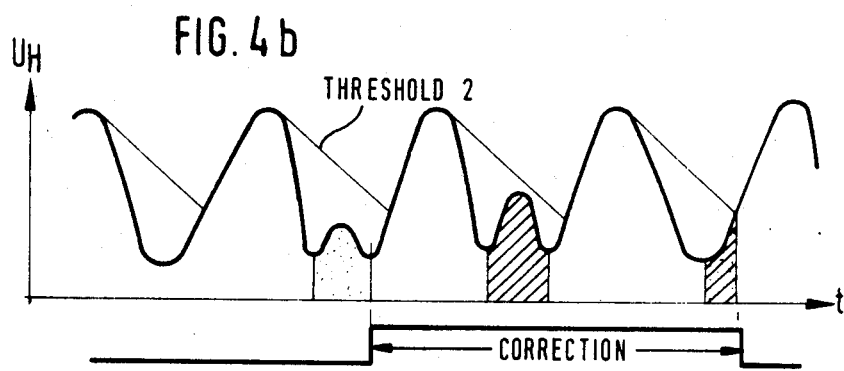
Figure 4C:
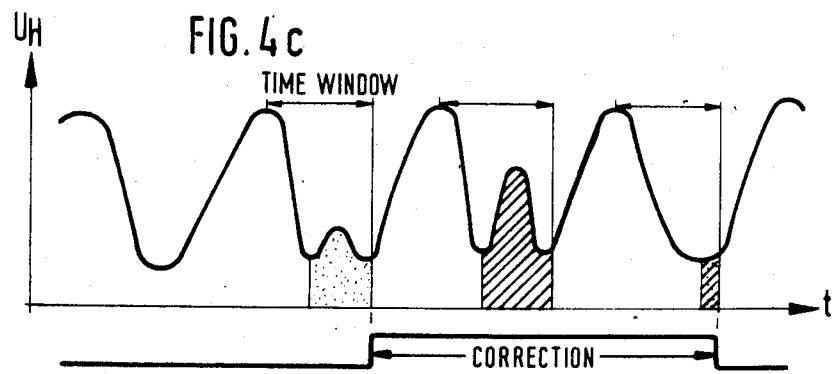

Another possibility which is illustrated in FIG. 4b is to limit the signal sections in which the presence of characteristic points is checked by means of a second threshold which is regulated with time over one period starting from the peak value of the output signal of the flow meter. It has proved suitable to regulate the second threshold in dependence upon rotational speed or load. This permits a further reduction in the system-inherent error after the end of the back pulsation.

A third embodiment is based on limiting the time in which the signal shape is checked for characteristic points in dependence on the rotational speed. Starting from the peak value of the signal, a time window is set the width of which is again adjustable in dependence on rotational speed or load. Only within this time window is it possible to detect characteristic points during each signal period. This measure too permits a reduction in the system-inherent error.

Figure 2B:
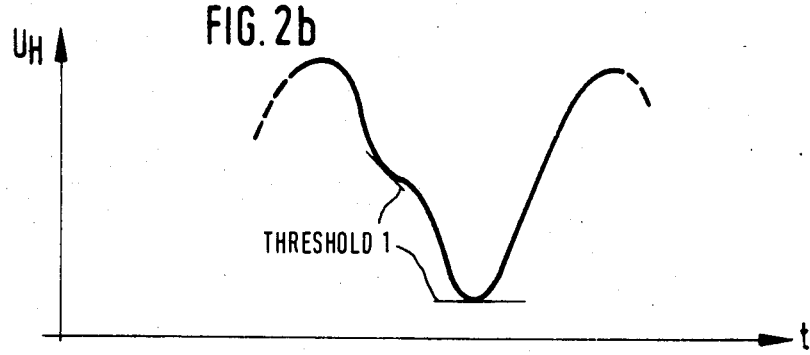

It is to be understood that the explanations given above and the subsequent detailed description of an embodiment are not limited to output signals of the flow meter of FIG. 1a but apply equally to the signal shape of FIGS. 1b and 1c. Of relevance is only the special choice of the threshold values of the first threshold as shown in FIGS. 2a and 2b. The explanations were limited to the signal shape of FIG. 1a merely for reasons of simpler representation.

Figure 5:
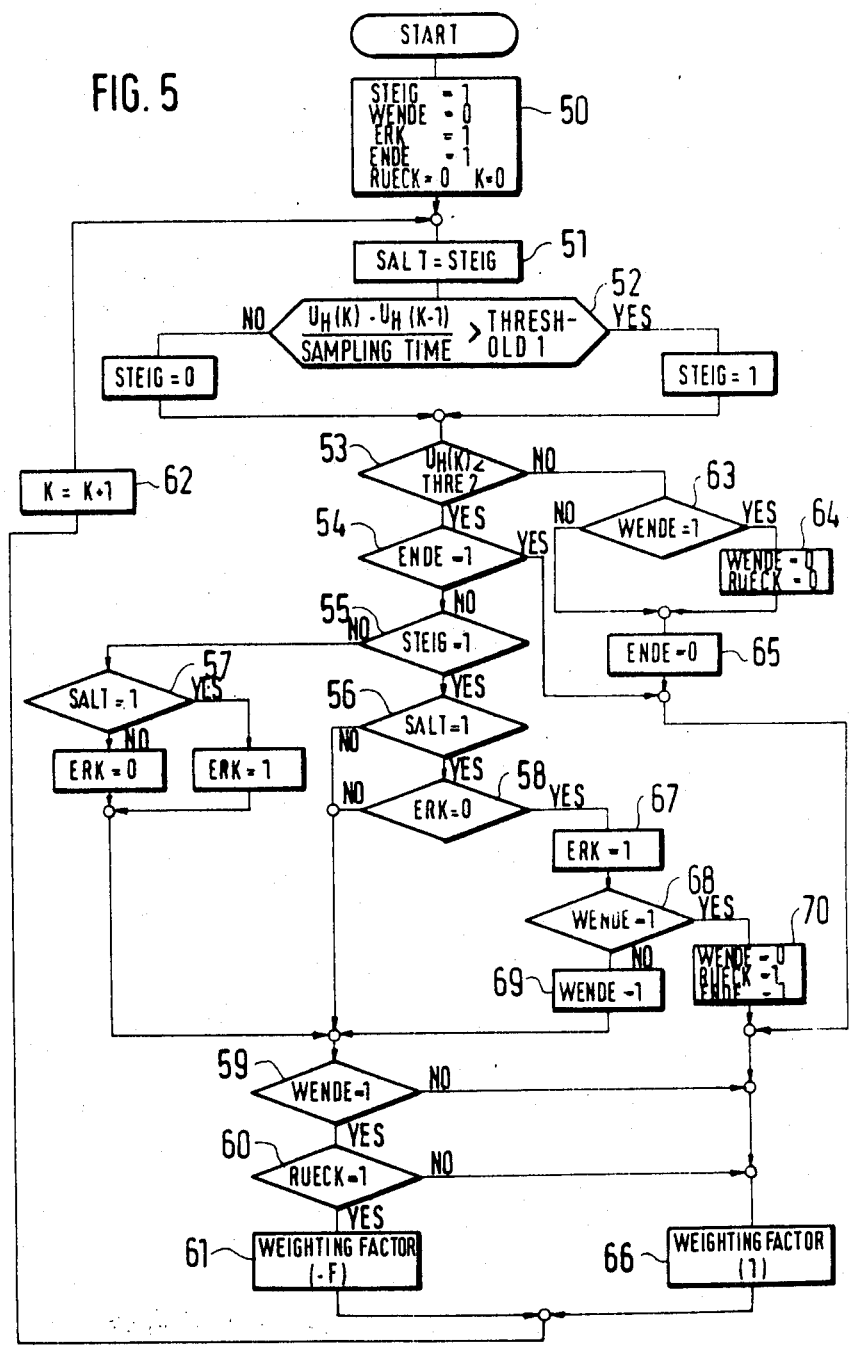
FIG. 5 is a detailed flowchart for evaluation of the measured values.

FIG. 5 is an embodiment of a flowchart to implement the method of the invention. An analog-to-digital converter converts the output signals of the flow meter into digital values at an adjustable sampling rate, such that, depending on the sampling rate, an actual digitalized value $U_H(K)$ is available at intervals of about $t_K - t_{K-1} \cong 1$ millisecond.

To summarize, the essential steps of the method are listed in the following. A characteristic point is recognized if:

(a) during at least two successive sampling time points the slope of $U_H$ is below the predeterminable threshold 1 within one period of $U_H$; and, (b) subsequently the slope of $U_H$ is above the predeterminable threshold 1 during at least two successive sampling time points (this filters out any pulse spikes superposed on the flow meter output signal).

(c) If more than two characteristic points are detected during one period, the first two characteristic points will determine the start and the end of the time interval during which the measured values are weighted with factor $-F$.

(d) The threshold 2, via which the signal section to be checked for characteristic points is determined, is formed by the signal mean value of the flow meter output signal plus an adjustable offset.

The variables used in the diagram of FIG. 5 have the following significance:

STEIG: Flag 1 if the slope of $U_H$ exceeds threshold 1; 0 in all other cases.

SALT: SALT is identical to signal STEIG shifted by one sampling period.

WENDE: Flag 1 during the first two characteristic points of a period, if they are present; 0 in all other cases.

ERK: Flag This control flag causes pulse spikes to be filtered out.

ENDE: Flag 1 if two characteristic points were detected during one period; 0 in all other cases (this variable prevents other characteristic points, if any, from being considered during this particular period).

RUECK: Flag 1 if a back pulsation is recognized; 0 in all other cases.

K: Counter index

Following initialization of the program part, the variables used in the program are assigned the values defined in block 50 of FIG. 5. In block 51 the variable SALT is defined and in block 52 the slope of the output signal $U_H$ is compared to threshold value 1. Depending on the results of this comparison, the variable STEIG is set to 0 or 1. By means of the inquiry in block 53, the signal sections are selected which are to be checked for characteristic points. If $U_H(k)$ values above threshold 2 are concerned, it will be checked in block 63 whether the variable WENDE possesses the value 1 which in the negative half-period can only be the case when threshold value 2 is exceeded for the first time. If the condition WENDE=1 is fulfilled, it was not the characteristic course of a back pulsation that was detected during the preceding half-period, but only a characteristic point. Therefore, the back-pulsation variable RUECK is set to zero in block 64 (if a back pulsation was previously detected, this terminates the program), and the variable WENDE is assigned the value zero as the start value for the subsequent negative half-period. If it is determined in block 63 that WENDE has the value zero, then the back-pulsation variable RUECK remains unchanged.

In block 65 the variable ENDE is assigned the value zero as the start value for the subsequent half-period. The air quantity values are then weighted with factor 1 in block 66 (no time interval with back pulsation).

However, if $U_H(k)$ lies below threshold value 2 in block 53 and if no two characteristic points were detected during the signal course below threshold value 2 (block 54, ENDE=0), it will be checked in blocks 55, 56 and 57 whether during steps (k) and (k-1) the signal course is or was on the rise (STEIG=1 and SALT=1) and whether during steps (k-2) and (k-3) the course of the signal was falling (ERK was set to zero in branch 57 if a falling signal course was detected during and prior to step (k-2)).

If these conditions are fulfilled a characteristic point is present. The next step is to establish whether this is the first or already the second characteristic point below threshold 2. For this purpose, block 67 first assigns the start value 1 to the variable ERK (this locks the path between blocks 58 and 67 as the signal continues to rise). If it is established in block 68 that the variable WENDE has the value zero, this signals the first characteristic point below threshold 2, and WENDE is assigned the value 1 in block 69. If WENDE is found to have value 1 in block 68, this signals the second characteristic point and consequently a characteristic back pulsation curve is recognized. Therefore, RUECK is set to 1 in block 70 (back pulsation recognized), and WENDE is set to 0 (second characteristic point recognized). For locking—in case further characteristic points below threshold 2 should be present (back pulsations only between the first two characteristic points)—ENDE is set to 1 in view of the inquiry in step (k+1) in block 54.

If the conditions for the paths leading to block 59 are fulfilled and if a back pulsation was recognized in step (k-1) (RUECK=1), $U_H(k)$ will be assigned weighting factor $-F$ after the inquiries in blocks 59 and 60. Subsequently, in block 62 the counter index is increased by 1, and the program is repeated cyclically starting with block 51.

Figure 6B:
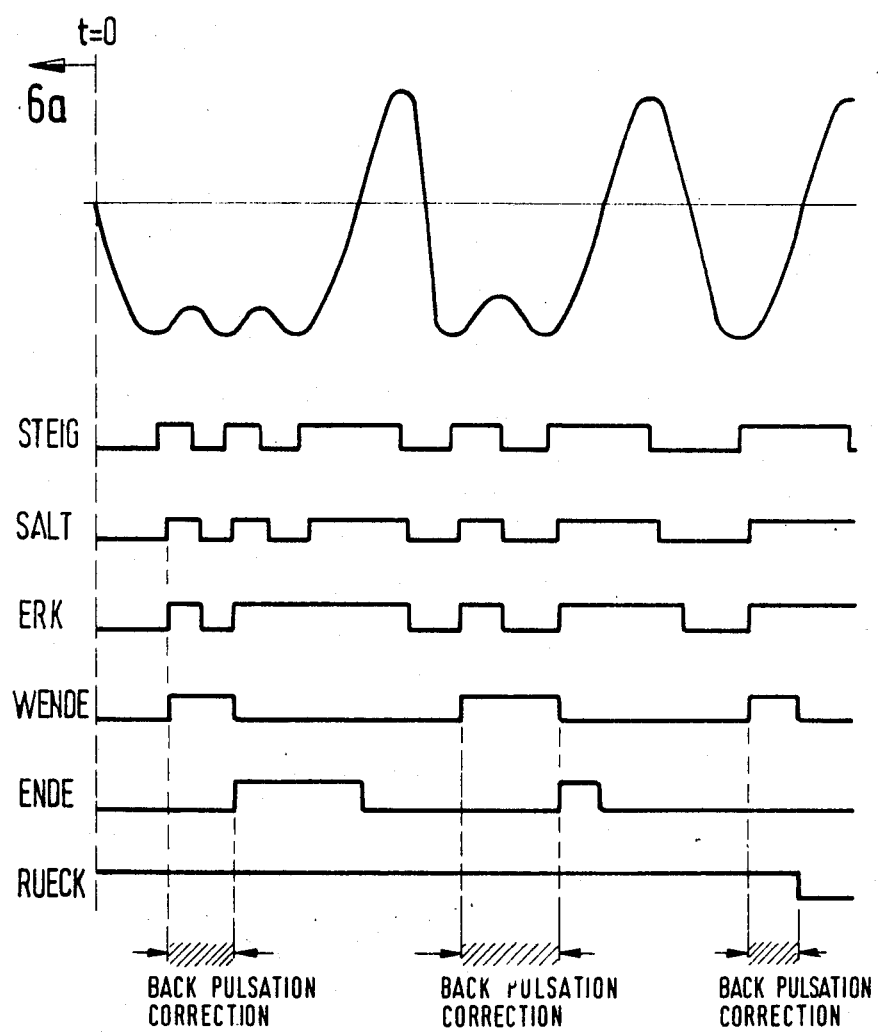
Figure 6C:
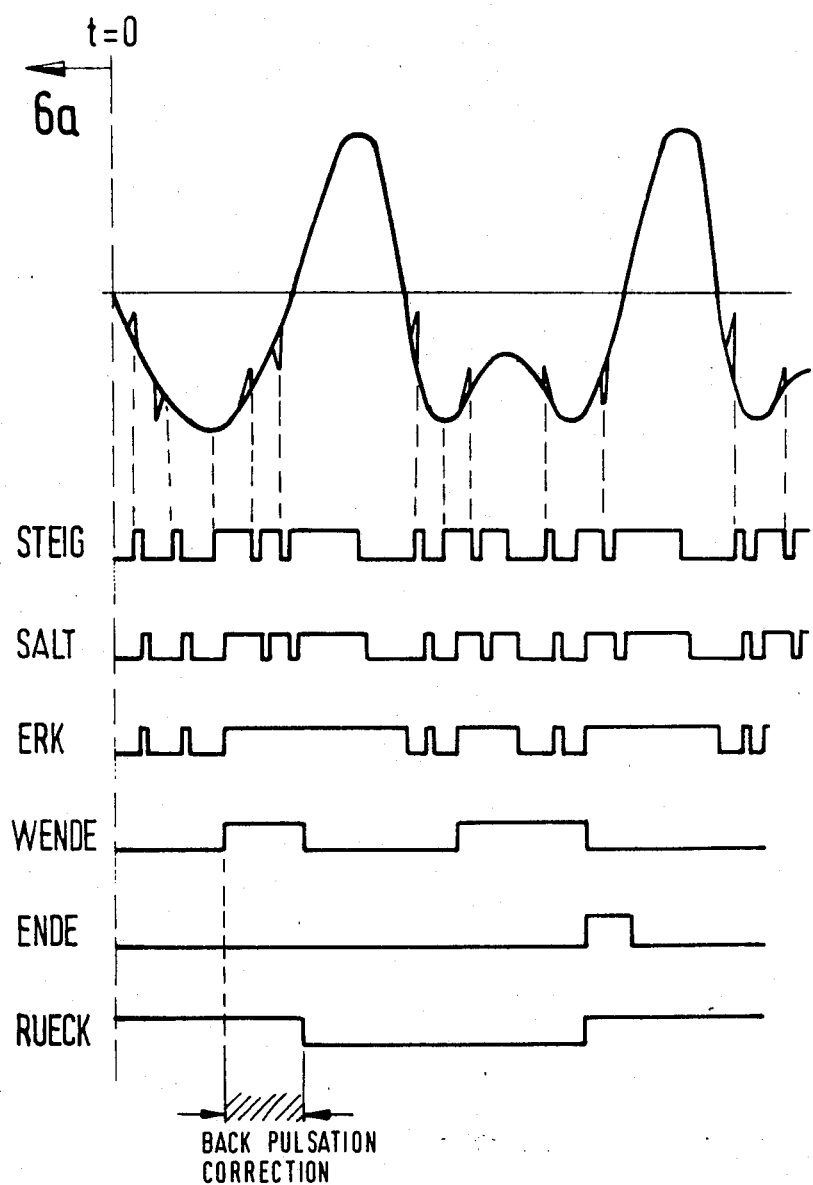

For a better understanding of the sequence of functions, FIG. 6 illustrates in detail, by means of some signal shapes shown by way of example, the time behavior of the variables referred to in the program part of FIG. 5. The diagrams are substantially self-explanatory so that only a few essential features will be discussed in the following. In this special embodiment, the threshold value of threshold 2 was defined as exactly the mean value of the output signal $U_H$. The sampling period $\Delta t$ between two samplings of signal $U_H$ results from the time interval $\Delta t$ by which the curve STEIG is to be shifted for congruence of the curves of STEIG and SALT. The diagrams of FIGS. 6b and 6c are to be interpreted such that at time $t=0$ the variables assume the values present in the diagram of FIG. 6a at time $t=0$. As indicated by the hatched time intervals, a back-pulsation correction occurs always if the variables WENDE, RUECK assume simultaneously the logic value 1. It can be recognized that, after the occurrence of a back pulsation during a period of signal $U_H$, back-pulsation corrections are provided in the next period. On the other hand, the diagram of FIG. 6c shows that pulse spikes are filtered out successfully, thus preventing these from releasing a back-pulsation correction. If more than two characteristic points are present per signal period (FIG. 6b), the corrections are only performed in the time interval between the first two characteristic points.

Another embodiment of the method of the invention will be explained in the following with reference to the flowchart of FIG. 8. The abbreviations used in the drawing and in the text are explained in more detail in FIG. 8a showing substantially the basic structure of the program. The basic program structure of FIG. 8a is understandable from the labelling and the explanations given in the preceding description and will need no further explanation. The detailed flowchart of FIG. 8b is subdivided into the following sub-function:

The sampled voltage values of the anemometer signal voltage are initially subjected to a peak value formation function. In the present special case, the peak value is regulated between the individual periods of the measuring signal according to FIG. 4b; this means that in particular a speed-dependent regulation is performed. In the present embodiment, the regulation time constant is stored in a 16-byte table. Subsequently, the sampling values for the measuring voltage (MLHD) are subjected to a linearization function f (MLHD) which can be performed in a known manner using a lookup table. The linearization function is followed by the generation of the slope bits STALT and STNEU. By switching the limit slope STOFF in dependence on the previous history (STALT), the disturbance elimination function is canceled for very small slopes (<STOFF) close to the horizontal. This increases the hit rate in the detection of a back-flow condition where "small fast humps" are involved.

The algorithm for detecting a backflow condition is not passed until the amplitude of the MLHD oscillation exceeds a minimum value DLTMLH. If the signal MLHD is in the vicinity of the peak value MLHX, all relevant control flags are generally set to zero (RUECK, WENDE, ENDE, STEIG). Only where two minima are detected (backflow!) does the RUECK bit remain unchanged. If signal MLHD remains in this range longer than a predetermined time period, which in the present special case is 15 milliseconds, a backflow condition cannot exist (RUECK=0). If the amplitude of MLHD becomes greater, the backflow algorithm will be passed. First, an interference-free direction of slope is formed (STEIG). When a signal minimum is passed through (STEIG 0→1), the backflow window is generated using bit WENDE. The ENDE flag permits detection of a backflow also if more than two minima occur. Subsequently, an integration having a predetermined operational sign of the anemometer measuring signal occurs by means of the integration function.

Overall, the method of the invention as disclosed in the embodiments of FIGS. 5 and 8 proves very suitable to avoid the disadvantages of known methods and to thereby ensure a high accuracy in the processing of measured values while, on the other hand, program complexity and computing time for implementing the method are kept within reasonable limits.

Figure 7:
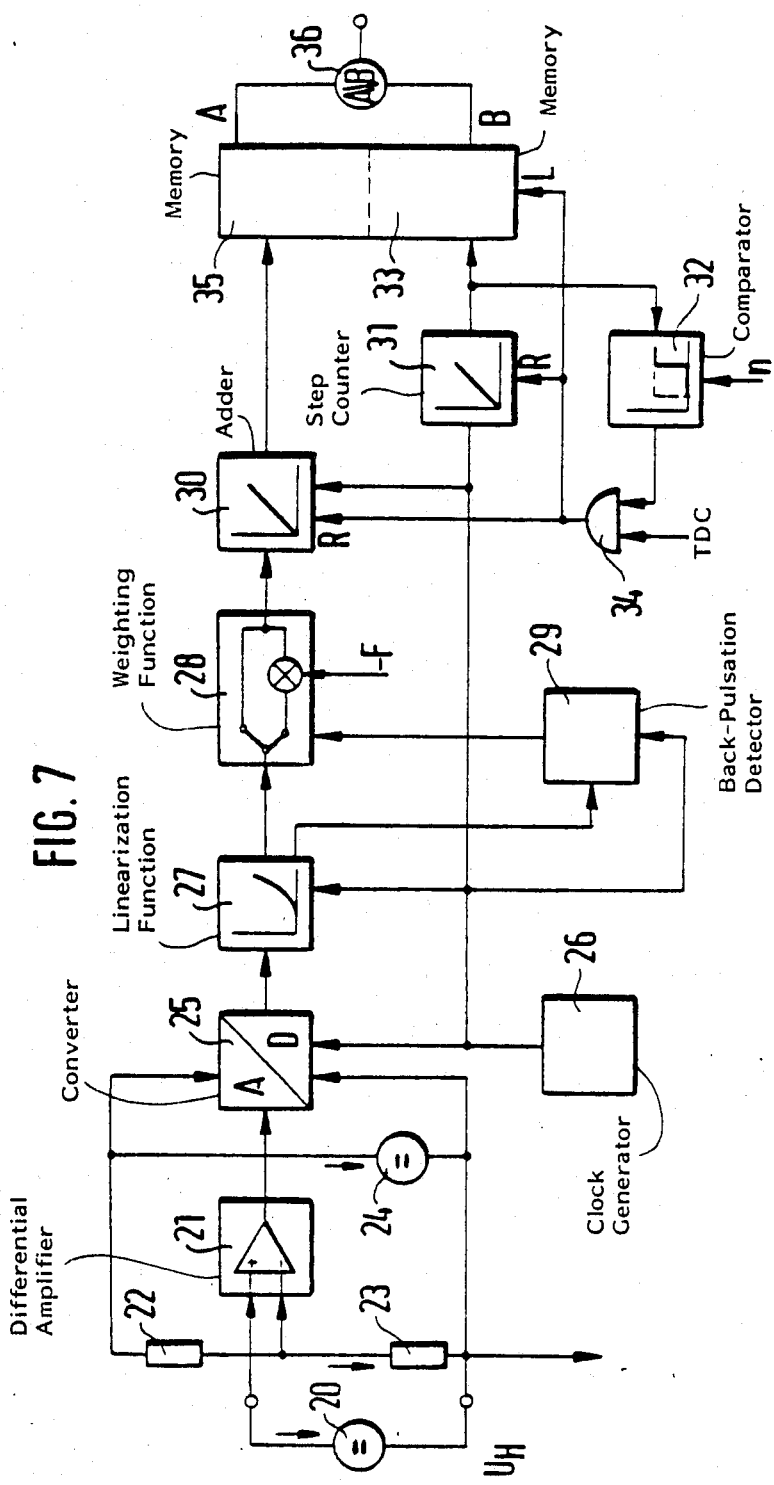
FIG. 7 is an embodiment of the apparatus of the invention.

FIG. 7 shows the embodiment of an apparatus for implementing the method of the invention. The output signals of the flow meter are shown symbolically by a voltage source 20 supplying signals $U_H$. The signals from voltage source 20 are applied to the input of a differential amplifier 21, the other input of which receives a reference voltage 24 from a voltage divider made up of resistors 22 and 23. The output signals of differential amplifier 21 are digitalized by an analog-to-digital converter 25. The reference voltage 24 is also connected to the analog-to-digital converter 25. A clock generator 26 generates a clock frequency which is variably adjustable and determines the sampling rate of the analog-to-digital converter 25. The digital output signals of the analog-to-digital converter 25 are subjected to a linearization function 27 which is configured as a lookup table, for example. The linearization function 27 is followed by a weighting function 28 which lets the digital signals pass either unchanged or weighted multiplicatively by a factor −F. This weighting function 28 receives the output of a back-pulsation detector 29 to which the signals of the linearization function 27 are also applied and which operates, for example, according to the method for detecting a change in the direction of flow as described in detail in the foregoing. An adder 30 adds a specific minimum number of linearized and weighted sampling values, while a step counter 31 stores the number of adding steps. For sequential control, step counter 31, adder 30, back-pulsation detector 29 and linearization function 27 are also connected to the output signals of clock generator 26. The output of step counter 31 is connected to a comparator 32 and a memory store 33. Comparator 32 compares the contents of the step counter with a threshold value which is dependent on, for example, the rotational speed or the rotational speed variation. After a specific minimum number of adding steps determined by the threshold value is attained, with arrival of the next TDC pulse (derived, for example, from a reference mark generator) the adding operation is interrupted in adder 30 via the output signals of an AND function. At the same time, the output signals of the AND function 34 control the transfer of the contents of step counter 31 into memory 33 as well as the transfer of the contents of adder 30 into a further memory 35. Following these transfers, the contents of adder 30 and step counter 31 are set to zero so that a new adding operation can begin.

It has proved particularly advantageous during highly dynamic changes of the output signal of the air throughput sensor which in an internal combustion engine can be detected via rotational speed variations, for example, to reduce the minimum number of adding steps determined by the threshold value of comparator 32 (for example, from 32 to 8 values). This permits rapid measurements in transition ranges without affecting the accuracy in the steady-state operation.

Finally, a divider 36 divides the result of the addition, which is stored in memory 35, by the number of adding steps held in memory 33. The final result obtained is thus a mass of a fluid flowing per unit of time, integrated over a period of time determined by the threshold value of comparator 32. This signal can then be used in the calculation of the duration of injection $t_L$ as usual.

Since, as a result of the integration of the output signal of the air throughput sensor, a major part of the statistic fluctuations superposed on the output signal is eliminated by averaging, the possibility exists to further process the integrated signal with a higher resolution than that of the analog-to-digital converter. If, for example, an 8-bit analog-to-digital converter is used, it has a resolution of about 4 per mil. However, the averaging operation makes it possible to further process the integrated signal as an 11-bit number with a resolution of about 0.5 per mil. This is easily accomplished by the program dividing the contents of memory 35 only by a fraction of the value held in memory 33 and by assigning a different place value to the digits of the resultant.

Further, this apparatus also permits an effective smooth circuit configuration by damping the air quantity signal, because the information on the air throughput per unit of time is available explicitly and not mixed with other quantities such as engine load, for example.

It is understood that the foregoing description is that of the preferred embodiments of the invention and that various changes and modifications may be made thereto without departing from the spirit and scope of the invention as defined in the appended claims.

What is claimed is:

1. A method of measuring the flow rate of a medium flowing through a pipe such as the flow rate of air in the intake pipe of an internal combustion engine, the measurement being made with a flow-rate sensor insensitive to the direction of flow and having an analog output signal transformed into a sequence of discrete numerical values by means of an adjustable sampling rate, the method comprising the steps of:

evaluating the periodic output signal characteristic of the flow-rate sensor to detect the time points of the occurrence of changes in the direction of the flow;

considering the time durations of changed flow direction with corresponding corrective factors when determining the actual flow-rate value; and, the time points of changes in the direction of flow being determined by:

comparing the difference values of successive numerical values of the number sequence with a first threshold value;

determining the characteristic time points at which said difference values drop below or increase above said first threshold value; and, recognizing the change in the direction of flow with the presence of more than two characteristic time points per period of the output signal of said flow-rate sensor.

2. The method of claim 1, wherein said flow-rate sensor is a constant-temperature anemometer having a hot wire.

3. The method of claim 1, wherein said flow-rate sensor is a constant-temperature anemometer having a hot film.

4. The method of claim 1, wherein said first threshold value is dependent upon said sampling rate.

5. The method of claim 1, wherein the drop below or increase above said first threshold by a difference value is only considered if at least two previously occurring difference values have dropped below or increased above said first threshold value.

6. The method of claim 1, wherein a drop below or an increase above said first threshold value by a difference value is only then recognized if the follow-on difference value likewise drops below or increases above said first threshold value.

7. The method of claim 1, wherein said first threshold value is changeable at least within the duration of a period of the output signal of the flow-rate sensor and at least in dependence upon said period.

8. The method of claim 7, wherein said first threshold value takes on two different values within the duration of one period.

9. The method of claim 1, wherein a second threshold value is provided with a change in the direction of flow not being recognized for an output signal of the flow-rate sensor above said second threshold value.

10. The method of claim 9, wherein said second threshold value is determined at least in dependence upon the mean value of the output signal of said flow-rate sensor.

11. The method of claim 10, wherein said second threshold value is formed from the mean value of said output signal and an additive supplementary value.

12. The method of claim 9, wherein said second threshold value is determined in dependence upon the peak value of the output signal of the flow-rate sensor.

13. The method of claim 12, wherein said first threshold value and said second threshold value are regulated in dependence upon the duration of the period of the output signal.

14. The method of claim 1, wherein a change in the direction of flow is defined after a recognition of change in directional flow in the time interval between the first and the second characteristic time points.

15. The method of claim 14, wherein the sequence of the discrete numerical values is evaluated with a negative correction factor (F).

16. The method of claim 15, wherein said correction factor (F) takes on values in the range $1.10 \lesssim |F| \lesssim 1.30$.

17. The method of claim 1, wherein said sampling rate is adjustable in dependence upon the duration of a period of the output signal of the flow-rate sensor.

18. The method of claim 1, wherein said sampling rate is adjustable in dependence upon the gradient of the output signal of the flow-rate sensor.

19. The method of claim 1, wherein the sequence of discrete numerical values is added over a predetermined time period.

20. The method of claim 19, wherein said predetermined time period is adjustable in dependence upon the period time duration of the output signal of the flow-rate sensor.

21. The method of claim 20, wherein the summed value of the added numerical values is further processed with a resolution increased with respect to the resolution of the individual numerical values.

22. The method of claim 21, wherein said resolution is increased in steps ($2^n$, n = 1,2,3 ...).

23. The method of claim 19, wherein said predetermined time period is adjustable in dependence upon the gradient of the output signal of the flow-rate sensor.

24. The method of claim 23, wherein the summed value of the added numerical values is further processed with a resolution increased with respect to the resolution of the individual numerical values.

25. The method of claim 24, wherein said resolution is increased in steps ($2^n$, n = 1,2,3 ...).

26. An apparatus for measuring the flow rate of a medium flowing through a pipe comprising:

a flow-rate sensor;

an analog-to-digital converter operatively connected to said sensor;

linearization function means connected to said converter;

back pulsation recognition function means for recognizing changes in the direction of flow, said back pulsation recognition function means including: means for comparing the differential values of successive numerical values of the number sequence with a first threshold value; means for determining the characteristic time points at which there is a drop below or an increase above said first threshold value; and, means for recognizing the change in direction of flow with the presence of more than two characteristic time points per period of the output signal of said flow-rate sensor;

summation function means for evaluating the discrete numbers generated by said converter with a negative factor after a change in the flow direction and for forming a summation signal, said factor having values of $|F| > 1$; and, means for processing said summation signal with an increased resolution.

27. The apparatus of claim 26, wherein said flow-rate sensor is a constant-temperature anemometer.

* * * * *

UNITED STATES PATENT AND TRADEMARK OFFICE
CERTIFICATE OF CORRECTION

PATENT NO. : 4,669,301

DATED : June 2, 1987

INVENTOR(S) : Alfred Kratt and Cornelius Peter

It is certified that error appears in the above-identified patent and that said Letters Patent is hereby corrected as shown below:

In column 2, line 46: delete "patant" and substitute -- patent -- therefor.

In column 3, line 59: delete "$1.10 \leq | F | \leq 1.30$" and substitute -- $1.10 \lesssim | F | \lesssim 1.30$ -- therefor.

Signed and Sealed this

Fifth Day of April, 1988

*Attest:*

DONALD J. QUIGG

*Attesting Officer*  *Commissioner of Patents and Trademarks*